United States Patent [19]

Chang et al.

[11] 3,959,227

[45] May 25, 1976

[54] POLYFORMALS HAVING LOW METHYLOL END-GROUP CONTENT AND POLYURETHANES PRODUCED THEREFROM

[75] Inventors: Eugene Yue Chieh Chang, Somerville; Tsi Tieh Li, Milltown, both of N.J.

[73] Assignee: American Cyanamid Company, Stamford, Conn.

[22] Filed: May 2, 1973

[21] Appl. No.: 356,553

[52] U.S. Cl. ........................ 260/67 TN; 260/67 FP; 260/77.5 AP

[51] Int. Cl.[2] ..................... C08G 2/18; C08G 18/54

[58] Field of Search ................ 260/77.5 AM, 67 FP, 260/67 TN, 77.5 AP

[56] References Cited

UNITED STATES PATENTS

| | | | |
|---|---|---|---|
| 3,475,383 | 10/1969 | Stewart | 260/67 TN |
| 3,477,994 | 11/1969 | Schweitzer et al. | 260/67 FP |
| 3,557,058 | 1/1971 | Fiore et al. | 260/67 FP |
| 3,565,863 | 2/1971 | Schmilzer et al. | 260/67 TN |
| 3,575,930 | 4/1971 | Dinbergs | 260/67 TN |
| 3,756,985 | 9/1973 | Gerlach et al. | 260/67 FP |

*Primary Examiner*—H. S. Cockeram
*Attorney, Agent, or Firm*—Charles J. Fickey

[57] ABSTRACT

An improved polyformal is provided which has the formula:

$$V\left[R-O-CH_2-O\right]_x W$$

wherein R is the hydrocarbon portion of an α,ω-glycol, containing at least 4 carbon atoms in a single chain or a 4 carbon atom chain interrupted by a heteroatom which is oxygen or sulfur; wherein V is (a) $-OCH_2OH$ or (b) $-OCH_2ROH$ and W is (c) $-ROCH_2OH$ or (d) ROH, R being as defined, wherein the ratio of the total of (b) and (d) to the total of (a) and (c) is not less than 9:1; and x is an integer representing the degree of polymerization of a magnitude sufficient to produce a molecular weight of at least 500. In addition, improved isocyanate terminated prepolymers and polyurethanes are also provided, as well as processes for preparing the improved polyformal.

14 Claims, No Drawings

POLYFORMALS HAVING LOW METHYLOL END-GROUP CONTENT AND POLYURETHANES PRODUCED THEREFROM

Generally stated, the subject matter of the present invention relates to new and improved polyformals. More particularly, the invention relates to polyformals containing low concentrations of methylol end groups, and to elastomers derived therefrom, that is polyurethane elastomers based on polyformals as the polyol "soft segment" portion of the molecule.

BACKGROUND OF THE INVENTION

Polyurethanes are well known and the basic technology for their manufacture is well established. It is well known, that various polyols may be used in making polyurethanes, such as polyesters, polyethers, polyesters amides, and the like. Scant attention has been given to the use of polyformals as the polyol intermediate for polyurethanes.

Polyformals are a special case of polyacetals represented by the following formula where $R^1$ is hydrogen and $n$ is the degree of polymerization.

$$HO\left[R\text{-}O\text{-}\underset{R^1}{\underset{|}{CH}}\text{-}O\right]_n R\text{-}OH$$

They are condensation products of an $\alpha,\omega$-glycol and formaldehyde using an acidic condensation catalyst.

British Pat. No. 850,178, Hudson Foam Plastics Corp., describes a method for making polyformals, with a molecular weight of at least 1270, terminal hydroxyl groups and a hydroxyl number of less than 200, by reacting various diols with formaldehyde in the presence of an acidic catalyst at a temperature not exceeding 130°C. They are described as useful for polyurethane elastomers.

Muller et al in U.S. Pat. No. 2,961,428 discloses polyurethane plastics prepared from hydroxyl terminated polyformals derived from aromatic polyhydroxy compounds with aliphatically bonded hydroxyl groups. They are made in a manner similar to that disclosed in the British patent.

It has been observed that when polyformals are prepared in a conventional manner, as described in the British patent, and reacted with an organic diisocyanate, one or more of the following phenomena may occur: (1) foaming, (2) a higher viscosity is obtained than expected, (3) the isocyanate content of the resulting prepolymer is lower than expected, (4) color develops, and (5) gelation often occurs. In addition, the physical properties of a polyurethane elastomer prepared from such polyformals are inferior having a low hardness. Thus, polyformals have not been used to any significant extent in preparing polyurethane elastomers.

Finally, Schonfeld, J. Poly, Sci. 59, 87–92 (1962) has prepared and studied the properties of a homologous series of polyformal polyurethanes, and has observed that two types of hydroxyl end-groups are possible in polyformals prepared by conventional procedures: (1) methylol or hemiacetal, —O—R—O—$CH_2$—OH, and (2) alcoholic, —O—R—OH. Experience has shown that reaction of a diisocyanate with polyols containing alcoholic end-groups, e.g. polyesters, polyethers, polyesteramides, etc., proceeds without undesirable results and ultimately provides polyurethanes with outstanding physical properties. Thus, theoretically at least, it would be expected that polyformals would provide similar results.

The present invention represents the culmination of a long series of investigations, conducted largely by the inventors, directed to overcoming the inherent deficiencies of polyformals.

Accordingly, it is a primary object of the present invention to provide new and improved polyformals.

Another object of the invention is to provide an improved isocyanate terminated polyformal.

It is yet another object of the invention to provide an improved polyurethane elastomer based on the improved polyformals of the present invention.

Generally then, it is an object of this invention to provide an improved polyformal which is capable of functioning to provide polyurethane elastomers with outstanding physical properties.

Additional objects and advantages of the invention will be set forth in part in the description which follows and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects and in accordance with its purpose as embodied and broadly described, the present invention relates to a polyformal having the formula:

$$V\left[R-O-CH_2-O\right]_x W$$

wherein R is the hydrocarbon portion of an $\alpha,\omega$-glycol, containing at least 4 carbon atoms in a single chain or a 4 carbon atom chain interrupted by a heteroatom which is oxygen or sulfur; wherein V is (a) —$OCH_2OH$ or (b) —$OCH_2ROH$ and W is (c) —$ROCH_2OH$ or (d) ROH, R being as defined, wherein the ratio of the total of (b) and (d) to the total of (a) and (c) is not less than 9:1, and $x$ is an integer representing the degree of polymerization of a magnitude sufficient to produce a molecular weight of at least 500.

The present invention further provides an improved isocyanate terminated prepolymer and polyurethane elastomer based on such polyformal.

In addition, the invention also relates to an improved process for preparing polyformals, as well as a process for reducing the methylol end-group content of polyformals.

The present invention then, is based on the discovery that polyformals having a high concentration of methylol end-groups provide polyurethanes with inferior physical properties, and that polyformals having a maximum concentration of alcoholic hydroxyl end-groups, prepared by the reaction of $\alpha,\omega$-diols and formaldehyde under particular reaction conditions, or by after treatment, or both, provide polyurethanes with improved physical properties.

While it is not altogether clear why polyformals containing a high concentration of methylol end-groups produce inferior polyurethanes it may be that such end-groups are in equilibrium between an alcoholic hydroxyl end-group and formaldehyde, and when reacted with a diisocyanate the formaldehyde reacts with a urethane group to produce either a branched chain or a cross-link. This explanation is consistent with the observable facts, e.g. foaming caused by reaction of a diisocyanate with water; viscosity increase caused by branching or cross-linking; low isocyanate content caused by reaction of diisocyanate with water, and gelatin, caused by cross-linking if extensive enough.

Now in accordance with this invention, we have found a way to prepare polyformals having a molecular weight of at least 500 which do not exhibit the above phenomena and which result in polyurethanes with improved physical properties.

The polyformals are prepared by means substantially similar to the prior art, i.e. by reaction of a $\alpha,\omega$-diol with formaldehyde in the presence of an acidic catalyst. The diols should contain at least four carbon atoms between the hydroxyl groups, and include 1,4-butanediol, 1,5-pentanediol, 1,6-hexanediol, and the like. 1,6-Hexanediol is preferred. In addition, the diols may contain a heteroatoms, such as oxygen or sulfur, interrupting the carbon chain, such as in the thiodiethanol an diethyleneglycol; or minor amounts of such diols as $\alpha,\alpha'$-xylenediol or cyclohexanediol.

Suitable catalysts include the mineral acids such as hydrochloric acid, sulfuric acid, phosphoric acid; acid salts such as zinc chloride, aluminum chloride, boron trifluoride, ferric chloride, stannic chloride; sulfonic acids, such as camphor sulfonic acid, methanesulfonic acid, naphthalene sulfonic acid, and p-toluene sulfonic acid; or ion exchange resins containing sulfonic acid groups. The amount of catalyst is generally in the range of from about 0.1 to 10 percent by weight of diol.

In contrast to prior art procedures for the preparation of polyformals, an excess of diol of up to about 20 percent molar excess, i.e. a mole ratio of diol/formaldehyde of from about 1/1 to about 1.2/1, favoring alcoholic hydroxyl termination of the polyol. It is generally preferred to use up to about a 10 percent molar excess of diol. In this invention the term formaldehyde includes aqueous formaldehyde solutions, paraformaldehyde, and gaseous formaldehyde.

The condensation reaction is ordinarily conducted by heating for about 1 to 3 hours at a temperature of up to about 50°C in vacuo, 10 to 20 mm Hg is usually satisfactory, to effect removal of the bulk of water, then for about 1 to 3 hours at 50° to 70°C and finally for about 1 to 2 hours at about 90°C until the water content is below about 0.05 percent (Karl Fischer). The particular time and temperature cycle used is not critical as long as the water content is reduced to a desired level, preferably below about 0.05 percent.

Generally, using a strong acidic catalyst, preparation of polyformals according to the procedure described will give a low content of methylol end groups, i.e. below about 10 percent and usually below about 5 percent, of the total hydroxyl end-group concentration.

The catalyst is then filtered off, if a cationic ion exchange resin, treated with an anionic ion exchange resin, or a inorganic base to neutralize the acid catalyst. Inorganic bases such as sodium hydroxide, calcium hydroxide, barium hydroxide, trisodium phosphate, and the like, are useful. If necessary, the thus treated polyformal can be redried in vacuo to reduce the water content to 0.05 percent or less.

In another embodiment of this invention, the methylol end-group content of the polyformal can be reduced by end-treatment. This end-treatment is applicable to futher reduce the methylol end-group content of polyformals prepared in accordance with this invention, i.e. as described hereinabove, or to reduce the methylol end-group content of polyformals prepared according to conventional prior art processes. Thus, the methylol end-groups of the polyformal are effectively removed by treating the polymer with sodium sulfite, which forms water soluble addition compounds with formaldehyde. This end-treatment can be performed simultaneously with the neutralization of the acid catalyst with a base, as shown in the accompanying examples, or may be performed independently of the neutralization. Similar results are obtained with sodium bisulfite. Any alkali metal sulfite or bisulfite can be employed in a concentration which is a stoichiometric excess of 20 to 50 percent based on the methylol end-groups.

The thus prepared polyformals containing low methylol end-group concentration may now be reacted with a diisocyanate, either alone or in combination with other hydroxyl terminated polyols or low molecular weight diols or triols, to provide isocyanate terminated polyurethane prepolymers. Such prepolymers are prepared according to very well known procedures, whereby a hydroxyl terminated polyol is reacted with a stoichiometric excess of a diisocyanate such as tolylene diisocyanate or methylenebis (4-phenylisocyanate) which are preferred. The molar ratio of diisocyanate to polyol is generally from about 1.3 to about 3.0, preferably about 1.6 to 2.

With regard to the organic diisocyanates, any of a wide variety of organic diisocyanates may be employed in the reaction, including aromatic, aliphatic and cycloaliphatic diisocyanates and combinations of these types. Represenetative compounds include 2,4-tolylene diisocyanate, 2,6-tolyene diisocyanate, and isomeric mixtures thereof, which for the purposes of the present invention shall be referred to as tolylene diisocyanate, p-phenylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 2,2'-methylenebis (4-phenylisocyanate), 4,4'-methylenebis(cyclohexylisocyanate) and 1,5-tetrahydronaphthylene diisocyanate. Arylene diisocyanates, i.e., those in which each of the two isocyanate groups is attached directly to an aromatic ring are preferred. In general, they react more rapidly with the polyalkylene ether glycols than do the alkylene diisocyanates. The diisocyanates may contain other substituents, although those which are free from reactive groups other than the two isocyanate groups are ordinarily preferred. In the case of the aromatic compounds, the isocyanate groups may be attached either to the same or to different rings. Dimers of the monomeric diisocyanates and di(isocyanatoryl) ureas such as di(3-isocyanato-4-methyl-phenyl) urea, which are the subject of U.S. Pat. No. 2,757,185, Bartell, may also be used.

The isocyanate-terminated prepolymer may then be converted to useful polymers or elastomers by reaction with an essentially equivalent amount of water or an organic compound containing at least two hydrogen atoms having activity according to the Zerewitinoff test described by Kohler in J. Am. Chem. Soc. 49, 318 (1927), such as a diamine or a glycol. It is preferred that the ratio of total hydroxyl to total isocyanate of the polyurethane elastomer be approximately 1:1.

Suitable organic chain extending agents include, for example, ethylenediamine, hydrazine, dimethylpiperazine, methyliminobispropylamine, m-phenylenediamine, 4,4'-diaminodiphenylmethane, ethylene glycol, hexamethylene glycol, diethylene glycol, hydroquinone, butanediol, methylene-bis-orthochloroaniline, and the like.

The following examples are provided for illustrative purposes and may include particular features of the invention. However, the examples should not be construed as limiting the invention, many variations of which are possible without departing from the spirit or scope thereof.

EXAMPLE I

A mixture of 1,6-hexanediol (118 grams, 1.035 mole), 46.5 percent aqueous formaldehyde (64.5 grams, 1 mole) and 3 grams Dowex 50 Wx8, a 200 mesh cationic ion-exchange resin sold by Dow Chemical Co. was stirred under an applied vacuum of 15 to 20 mm. The temperature was raised to about 50°C. and held for 3 hours; then for 3 hours at 70°C and finally for 5 hours at 90°C. The cationic resin was filtered. The resulting polyformal had a molecular weight, based on hydroxyl content, of 1020. Of the total hydroxyl end-group concentration, 1.7 percent were found to be methylol end-groups.

EXAMPLE II

This example demonstrates the marked reduction in methylol end-group content by treating a polyformal containing a high methylol content with sodium sulfite.

A mixture of thiodiethanol (122 grams, 1 mole), 46.5 percent aqueous formaldehyde (64.5 grams, 1 mole) and 0.2 gram of $BF_3.Et_2O$ was stirred for 18 hours at 50°C under a vacuum of less than 10 mm. The mixture was then stirred with an anionic exchange resin, Amberlyst 21-Rohm and Haas Co., to neutralize the catalyst and then filtered. On analysis, 55 percent of the terminal hydroxyl groups were found to be methylol groups. The polymer was then heated in vacuo for 24 hours at 50°C. with no resulting change in methylol content.

A 40 gram portion was shaken with 40 ml. water, 2 ml. 5N sodium hydroxide and 5 ml. saturated solution of sodium sulfite, washed several times with water until neutral, and dried by heating at 70°C in vacuo. The methylol end-group content was 2.6 percent.

The following examples represent poly-1,6-hexane formal, prepared according to varying conditions to obtain a range of methylol end-group content. The resulting polymers were converted to polyurethane elastomers and subjected to a thermal analysis to determine the effect of methylol end-group concentration on the thermal stability.

EXAMPLE III

The procedure of Example I was repeated with the exception that the mixture was heated for 2 hours at 90°C instead of 5 hours. A polymer was obtained having 3.3 percent methylol end-groups and a molecular weight of 960.

EXAMPLE IV

The procedure of Example I was followed with the exception that the mole ratio of 1,6hexanediol to formaldehyde was 1.06 to 1 instead of 1.035 to 1. The resulting polymer contained 3.9 percent methylol end-groups and had a molecular weight of 880.

EXAMPLE V

Using equimolar amounts of 1,6-hexanediol and formaldehyde, the reaction mixture was heated under 3mm vacuum for 2.5 hours at a temperature of about 75°C., then for 6 hours at 80°C. The polymer contained 7 percent methylol end-groups and had a molecular weight of 1080.

EXAMPLE VI

Using a mole ratio of 1,6-hexanediol to formaldehye of 1.1 to 1, the mixture was heated at 50°C for 5 hours under a vacuum of 3–4 mm, then for 1 hour at 70°C. The methylol content of the polymer was 9.1 percent and the molecular weight was 904.

EXAMPLE VII

The polyformal of Example I, 408 grams, was reacted with 10 grams of 46.5 percent aqueous formaldehyde by heating under a 3 to 4mm vacuum for 2 hours at 70°C. The resulting polymer had 20 percent methylol end-group content and a molecular weight of 1108.

EXAMPLE VIII

A mixture of 114 grams, 1 mole of 1,6-hexanediol, 46.5 percent aqueous formaldehyde (1.1 mole, 71 grams) and 6 grams of Dowex 50Wx2, a 200 to 400 mesh, cationic exchange resin sold by Dow Chemical Co., was heated at 70° to 75°C for 4 hours under a vacuum of 100 mm, then for 1.75 hours at 75°C and 3mm. On removing the catalyst, the polymer was found to contain 24 percent methylol end-groups and to have a molecular weight of 1141.

EXAMPLE IX

The polyformals of Example I and Examples III thru VIII were reacted with 2,4-tolylene diisocyanate using a mole ration of NCO/OH of 1.7 to 1.75:1. The resulting isocyanate terminated polyurethane prepolymers had an isocyanate content of 4.2 to 4.4 percent by weight. These prepolymers were then reacted with a stoichiometric amount of trimethylolpropane* and cured to give polyurethane elastomers, which were then subjected to thermal analysis using the technique described by A. Singh et al in J. Poly Sci. Pt. 3, 1675)1965) and J. Poly. Sci. 4, 2551 (1966).

*Stress relaxation of elastomers requires a cross-linked, network structure.

The samples were then tested on a six-channel, autographic stress relaxometer. This instrument consists of load sensing elements, a means of extending and maintaining the specimens at a constant elongation, and a circulating air oven. The oven temperature was maintained at 120°C ± 0.1°C and the specimens extended to 5 ± .05 percent. The decrease in modulus with time, due to thermal degradation, was recorded automatically by the instrument. Data relating to the relative thermal stability are obtained from plots of $f(t)/f(o)$ versus log time, or $\log f(t)/f(o)$ versus time, where $f(t)$ and $f(o)$ are the forces at time $t$ and $t=o$, respectively, required to maintain the sample at a given extension.

The data are reported as $T_{50}$, which represents the time required for a sample to degrade to give a stress value equal to 50 percent of the initial stress ("Half-life"). This is a measure of the amount of degradation experienced by the specimen. The rate of stress-decay observed thru stress relaxation measurements can be directly related to the rate of chemical chain scission reactions responsible for the degradation.

Table I summarizes the data obtained from the elastomers prepared from the polyformals of Examples I and III to VIII.

TABLE I

| Polymer of | Percent Methylol end-groups | $T_{50}$(Half-life), min. α 120 °C |
|---|---|---|
| Example I | 1.7 | 4100 |
| Example III | 3.3 | 3300 |
| Example IV | 3.9 | 3100 |
| Example V | 7.0 | 2100 |
| Example VI | 9.0 | 2300 |
| Example VII | 20.0 | 1800 |
| Example VIII | 24.0 | 1200 |

From the above results it is clearly apparent that thermal stability of polyurethane elastomers based on polyformals is highly dependent on the percentage of the total hydroxyl end-group content which is due to methylol groups.

We claim:

1. A polyformal having the formula:

$$V \left[ R - O - CH_2 - O \right]_x W$$

wherein R is the hydrocarbon portion of an α,ω-glycol, containing at least 4 carbon atoms in a single chain or a 4 carbon atom chain interrupted by a heteroatom which is oxygen or sulfur; wherein V is (a) $-OCH_2OH$ or (b) $-OCH_2ROH$ and W is (c) $-ROCH_2OH$ or (d) ROH, R being as defined, wherein the ratio of the total of (b) and (d) to the total of (a) and (c) is not less than 9:1; and $x$ is an integer representing the degree of polymerization of a magnitude sufficient to produce a molecular weight of at least 500.

2. The polyformal according to claim 1 wherein R is hexamethylene.

3. The polyformal according to claim 1 wherein the ratio is 20:1.

4. An isocyanate terminated prepolymer prepared by reacting the polyformal of claim 1 with a stoichiometric excess of an organic diisocyanate.

5. The prepolymer according to claim 4 wherein the organic diisocyanate is tolylene diisocyanate.

6. The prepolymer according to claim 4 wherein the organic diisocyanate is methylenebis (4-phenylisocyanate).

7. A polyurethane elastomer prepared by chain-extending the prepolymer of claim 4.

8. The polyurethane elastomer according to claim 7 wherein the chain extending agent is water.

9. The polyurethane elastomer according to claim 7 wherein the chain extending agent is an organic compound containing at least two active hydrogen atoms which display activity according to the Zerewitinoff test.

10. The polyurethane elastomer according to claim 9 wherein the organic compound is a diamine.

11. The polyurethane elastomer according to claim 9 wherein the organic compound is a glycol.

12. The polyurethane elastomer according to claim 7 wherein the ratio of total hydroxyl to total isocyanate is approximately 1:1.

13. A process for preparing improved polyformals which comprises reacting the polyformal with an alkali metal sulfite or bisulfite in a concentration which is a 20 to 50 percent stoichiometric excess based on the methylol end-group, and thereby effecting a reduction of the methylol end-group concentration of the polyformal to the extent that the ratio of R—OH end-groups to hydrogen end-group is at least 9:1.

14. The process according to claim 13 wherein the alkali metal is sodium.

* * * * *